March 31, 1931.  H. M. DENYES  1,798,931

SWITCH

Filed Nov. 25, 1927

Inventor
Harry M. Denyes
By Blackmore, Spencer & Flick
Attorneys

Patented Mar. 31, 1931

1,798,931

UNITED STATES PATENT OFFICE

HARRY M. DENYES, OF SAGINAW, MICHIGAN, ASSIGNOR TO GENERAL MOTORS CORPORATION, OF DETROIT, MICHIGAN, A CORPORATION OF DELAWARE

SWITCH

Application filed November 25, 1927. Serial No. 235,721.

This case relates to steering wheel mechanism.

It is an object of the invention to provide a new and improved steering wheel mechanism embodying the spark and throttle controls, the lighting switch and the switch button for the signal. It is an object of the invention to mount the control mechanism referred to at the top of the steering wheel column in such a manner that it is not affected by turning movement of the steering wheel and in a position where it is readily accessible to the operator.

It is a further object of the invention to provide a switch for the signal which can be installed at the top of the steering wheel column in its usual place and which does not interfere with the normal operation of the engine and light controls which are also mounted at the top of the steering column above the steering wheel.

Other objects and advantages of the invention will appear in the course of the following description, taken in connection with the accompanying drawing and appended claims.

Figure 1:
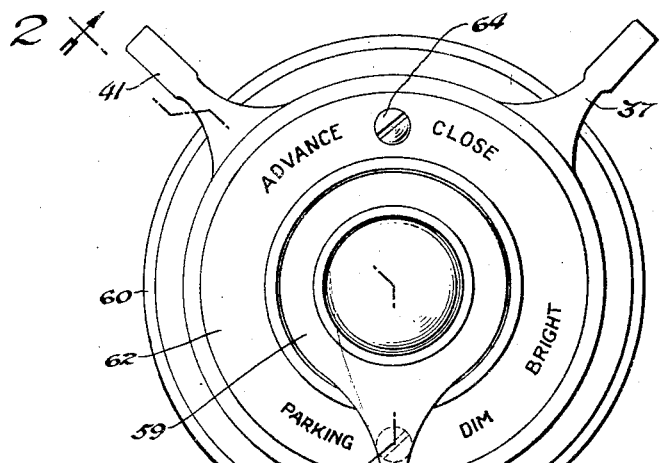
Figure 1 is a plan view of my improved control mechanism.
Figure 2:
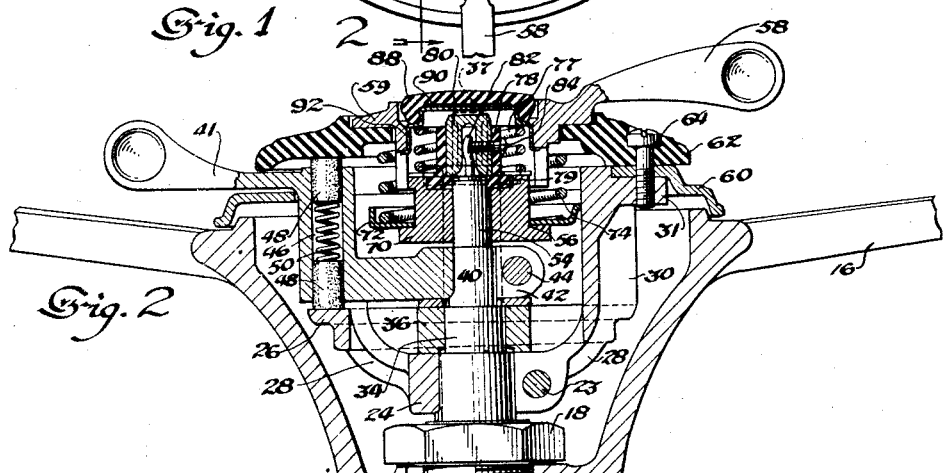
Figure 2 is a section on the line 2—2 of Figure 1, showing the upper portion of the steering column and the control mechanism carried thereby.
Figure 3:
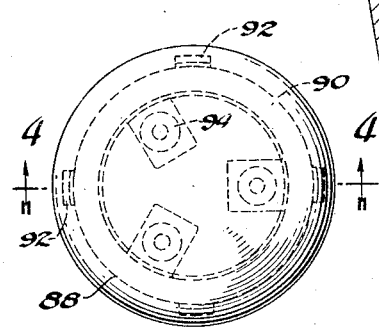
Figure 3 is a plan view of the horn button.

Referring to the drawing, I have illustrated in Figure 2 a tubular casing 10 which is fixed in place on the car by any usual means (not shown). At its upper end the casing 10 is provided on its inner side with a bushing 12 which functions as a bearing for supporting the tubular steering shaft 14. The steering wheel 16 is provided with a cone-shaped opening through its hub adapted to fit the similarly shaped upper end of shaft 14. Nut 18 is threaded on the upper end of shaft 14 and serves to hold the steering wheel fast on shaft 14.

Within the steering shaft 14 and spaced therefrom by means of bushing 21 is the tubular supporting shaft 22 for the control mechanism. Shaft 22 is held non-rotatably in position by any usual or desired means (not shown) at the base of the steering column and extends a short distance above nut 18, as illustrated. Fixed to the upper end of shaft 22 is the supporting base for the control mechanism.

The supporting base comprises a bifurcated hub 24 adapted to be clamped to shaft 22 by means of bolt 23. Integral with the hub 24 and extending radially outward and upward are four spokes 28 which support the annular rim 26. Rim 26 is flat on its upper face except that two posts 30 which are integral therewith extend vertically therefrom. The posts 30 are provided with outward extending flanges 31 for centering and supporting the bevelled ring 60 upon which rests the cover plate 62, the plate and ring being held on the flanged portions 31 by means of screws 64.

Within the stationary supporting shaft 22 are nested the tubular, rotatable control shafts 34, 40 and 54. Fixed to the upper end of the outer shaft 34 is the hub 36 of the throttle lever 37. This lever extends upward from the hub and outward between the bevelled ring 60 and the rim of the cover plate 62 and is frictionally held in adjusted position in the same manner as lever 41, described in detail below. In this connection it may be noted that ring 60 is bent down on each side of each flange 31 of the respective supporting ports 30 in order to vertically space cover plate 62 and ring 60 for permitting limited lateral movement of levers 37 and 41 which extend out between the ring and cover plate.

Just above hub 36, the hub 42 of the spark control lever 41 is fixed to shaft 40 by means of bolt 44. The lever 41 extends radially from the hub 42, then axially upward, then outward between ring 60 and cover plate 62. The axially extending portion is hollow and carries two plungers 48, of leather or similar material, between which is arranged a compressed coil spring 50. The upper plunger 48 is thus kept frictionally engaged with the under side of cover plate 62 while the lower plunger 48 is kept in frictional engagement with the upper surface of rim 26.

Keyed to the inner shaft 54 just above hub 42 is the hub 56 of the lighting switch lever 58. The hub 56 extends upward and is flanged outward, as at 59, for fitting in a correspondingly shaped recess on the upper side of cover plate 62. Hub 56 is formed on its lower portion with an annular flange 70 within which is crimped a cupped supporting ring 72. Surrounding the hub 56 between ring 72 and the under side of the cover plate 62 is a compressed coil spring 74. Coil spring 74 constantly urges hub 56 downward and holds it non-rotatably on shaft 54, and performs the additional function of holding flange 59 of lever 58 in frictional contact with the cover plate 62. Upon removal of the cover plate 62 and loosening of screw 64, the hub 56 with the switch button mechanism may be readily removed with the cover plate.

Hub 56 is provided on its upper side with an annular recess for reception of the switch mechanism for the signal, which may be a horn or bell or similar device. At the bottom of the recess is a smaller recess within which is set the base of a hollow insulating plug 78. A washer 79 surrounds plug 78 within the recess and extends out over a portion of the hub 56 within the recess. Within the insulating plug 78 is the metallic contact member 80 which is recessed from underneath as illustrated. Extending up into the recessed contact member 80 is the uninsulated end 82 of the insulated conductor extending down through the hollow shaft 54 to the signalling device (not shown). The end 82 is held within the terminal member 80 by means of a screw 84 extending through a hole in the insulating plug and threaded in the side of the terminal 80. Fitting over the member 80 is the switch button.

Figure 4:
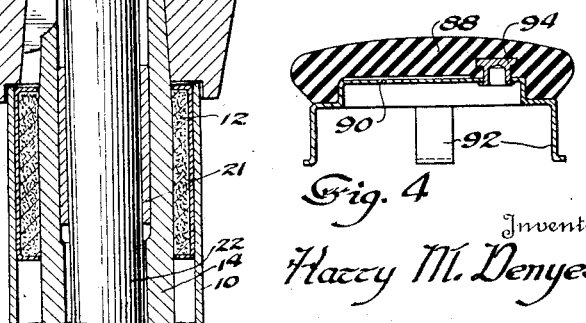
Figure 4 is a section on the line 4—4 of Figure 3.

The switch button comprises a main or outer portion 88 of suitable insulating material within which is moulded three hollow rivets 94. A metallic plate or stamping 90 is fixed to the under side of the outer portion 88 by means of the three rivets 94, as illustrated in Figure 4. The edge of plate 90 is formed with four downward extending fingers 92 which are bent outward through the respective vertical slots in the side of hub 56. Surrounding plug 78 between cap 90 and washer 79 is a coil spring 77 which constantly urges the switch button upward. In its normal position cap 90 is slightly spaced from terminal member 80 but contacts therewith upon downward movement of the switch button. When this is done the terminal member 80 is grounded through plate 90, hub 56 and the tubular shafts connected with the metallic framework of the car.

The switch button mechanism is thus mounted within the hub of the upper, and hence inner, control lever and does not interfere with its operation. By the construction described, the inner hub and switch button mechanism are readily removable for disassembling.

I claim:

1. Control mechanism for use with a steering column comprising an outer fixed tubular shaft and an inner rotatable shaft, a base member mounted on the fixed shaft, a hub provided with an operating arm mounted on the rotatable shaft, a cover plate for said base positioned over said hub, said cover plate being provided with an opening therethrough, said hub being formed with a recess provided with axially extending slots, an insulated terminal fixed in said recess, a switch member comprising a grounding element having portions extending into said slots for sliding movement therein for connecting and disconnecting from said terminal, and resilient means for holding said grounding element spaced from said terminal.

2. Steering wheel control mechanism, including a rotatable control member, having a recess in its upper end, and an electric switch including a terminal positioned within the recess and fixedly carried by said member, a relatively movable cap consisting of a molded insulator portion having a rivet embedded therein, a plate secured to said portion by the rivet and having a dependent marginal foot slidably engaged in a groove in said member, to hold the cap in place while permitting its depression to ground the switch through said foot by moving the plate against the terminal, and a spring element interposed between the cap and said member to yieldingly hold the plate away from the terminal.

3. Steering wheel control mechanism including a hollow rotatable tube, an electric current conductor enclosed within the tube, a recessed head on the upper end of the tube thru which rotation of the tube is under manual control, a switch located within said recess and comprising a fixed contact element connected with said conductor, and a movable contact element grounded thru portions thereof that extend into slots in said head for relative sliding movement therewith when the movable contact element is brought into contact with the fixed contact element, and resilient means for yieldingly holding the grounding element spaced from said fixed contact element.

4. Steering wheel control mechanism, including a hollow tube rotatably mounted in the steering column, a current conductor enclosed within the tube, a recessed head on the upper end of the tube by means of which the rotation of the tube is manually controlled, a switch located within said recess and connected with said conductor, and including a depressible button in the open end of the recess and means to retain said button in place including a projection slideable into an axial groove in the control head and through which the circuit controlled by said switch is grounded.

5. Steering wheel control mechanism, including a hollow tube rotatably mounted in the steering column, a current conductor enclosed within the tube, a recessed head on the upper end of the tube by means of which the rotation of the tube is manually controlled, a switch located within said recess and connected with said conductor, and including a depressible button in the open end of the recess and means to connect the button and head to permit relative axial movement therebetween, including a projection on one of the parts extending into an axially extending notch in the other part and through which said conductor is grounded when the switch is closed.

6. Steering wheel control mechanism including a recessed head, a switch within the recess including a fixed contact element and a depressible button movable into engagement with the contact element to close the switch, a spring adapted to hold the button out of engagement with said contact element, and a connection between the button and head through which the circuit to be closed by said switch is grounded consisting of co-operating lateral projections and axial notches in which notches the projections extend for sliding movement.

In testimony whereof I affix my signature.

HARRY M. DENYES.